April 29, 1941.  J. P. CLOSSON  2,240,155
MOP
Filed Jan. 9, 1939

Inventor:
John P. Closson.
By: [signature]
Att'y.

Patented Apr. 29, 1941

2,240,155

UNITED STATES PATENT OFFICE 2,240,155

MOP

John P. Closson, Chicago, Ill., assignor, by mesne assignments, to The A. S. Boyle Company Application January 9, 1939, Serial No. 249,961

5 Claims. (Cl. 306—20)

This invention relates to a flexible coupler means for joining the handle to a mop head, and more particularly a rubber coupler to which the mop head may be attached without the use of tools, nuts and bolts, or the like.

In the last two years, mop manufacturers have been experimenting with rubber couplers which can readily be made to give a desirable flexibility between the handle and the mop head. The flexibility feature of metallic couplers has been almost wholly lost in recent years because in order to reduce costs on bearings and journals which by pivoting provided the flexibility, inferior material and machining have been used with the result that in order to eliminate high wear, the joints were made very tight. Development of the rubber coupler therefore looked toward restoring the flexibility between the handle and mop head. A second advantage of rubber couplers lies in the fact that they do not scar furniture. In the last few years, it has become general practice to cover metallic couplers with fabric guards—a considerable cost item.

But rubber couplers present a new difficulty. While there is no trouble in forming a tight boot for holding the handle, there is much difficulty in devising a way for effecting a firm joint between the coupler and the metallic mop frame. The difficulty lies in the nature of rubber and the shape of the frames. Where a soft rubber is used for the coupler, the metallic frame quickly wears the rubber of the coupler at the joint, rendering the mop unwieldy; where a hard rubber is used for the coupler, the life is increased, but at the expense of flexibility and ease of attachment. Most mop head frames are formed of a single wire—occasionally two twisted wires—and either the two ends of the wire are held together in the coupling or the coupling is fastened to some mid-point of the frame, as the type shown in Figure 1 of the drawing attached hereto. The coupler should have about one inch of purchase on the frame. Where the coupler is made of hard rubber with merely a hole in it, the coupler could not be forced from an end of the frame around sharp bends to the proper position—see Figure 1. On the other hand, where the rubber used for the coupler is sufficiently soft to pass such bends, it is so soft that flexing by usage enlarges the hole.

The above presents real problems for rubber couplers as witness the fact that despite the manifest advantages of rubber couplers, the only rubber coupler on the market today, to the best of my knowledge, is one of hard rubber employing a very unusual structure to receive the ends of a mop frame. There is no rubber coupler adapted to hold a mop frame at its mid-point now on the market. Frames which fasten to the coupler at their mid-point have proved their practical value.

The first object of this invention is to provide a rubber coupler which may be easily attached to the bearing portion of a wire mop frame at its mid-point.

The second object of this invention is to effect such a connection without making it necessary to slip the coupling over the end of the frame.

The third object of this invention is so to shape a slit into the journal of a rubber coupler, that the bearing of the mop frame will tend to lock itself in the journal regardless of the direction of the force in the mop frame bearing.

The above and other desirable objects will appear hereinafter in the description of the invention with reference to the accompanying sheet of drawings hereby made a part of this specification, and wherein.

The same reference character is used to identify a part in the specification that follows as is used to indicate the same part in the drawing.

Figure 1:
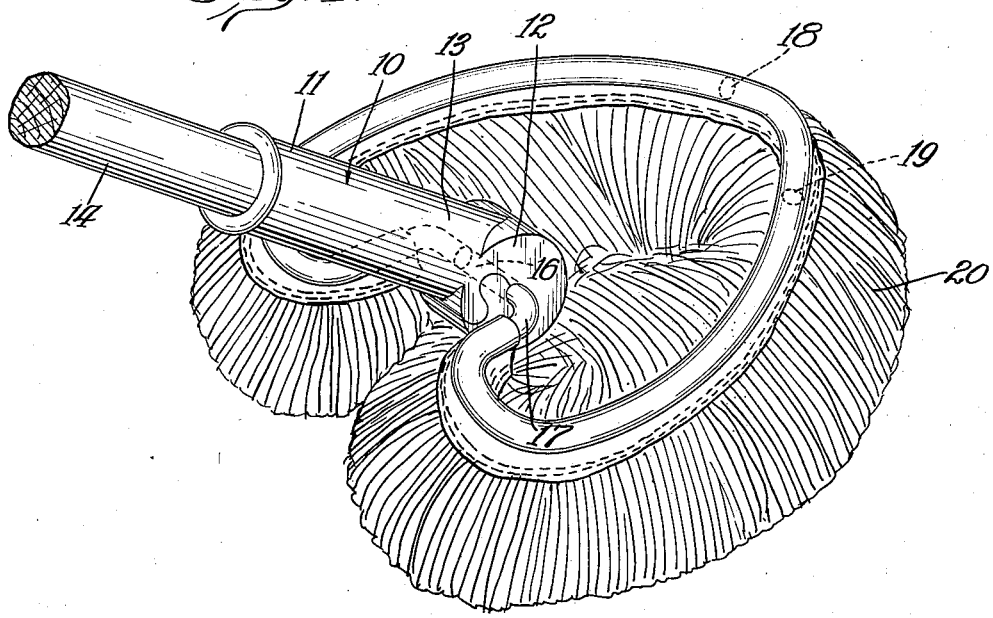
Fig. 1 is a perspective view of the rubber coupler linking a handle and a mop head.

Examining the invention in detail, in Fig. 1, the coupler, which is generally designated by the numeral 10, is shown as an integral piece of molded rubber with the handle socket 11 and cylindrical portion 12. The rubber is very flexible so that in use the rubber at 13 acts as a fairly free-acting universal joint between the socket 11 and the cylindrical portion 12. The inside diameter of the socket 11 is less than the diameter of handle 14 so that the handle is tightly gripped. The joint between the rubber socket 11 and the handle 14 is as firm as that between the ordinary commercial mop handle and socket when the latter is made of steel.

Into the cylindrical portion 12 is bored hole 15 which is generally referred to as a journal and into which slips the bearing 16 of the mop head frame 17. The particular mop shown is a slip-on mop wherein the ends 18 and 19 of the frame 17 terminate short of the toe so that the swat 20 may readily be removed. The slit 21 is S-shaped and possesses interlocking tongues 22 and 23. The top 24 of tongue 22 is a little above the top of journal 15. The cylindrical portion 12 is a little below the axis of the socket 11.

Figure 2:
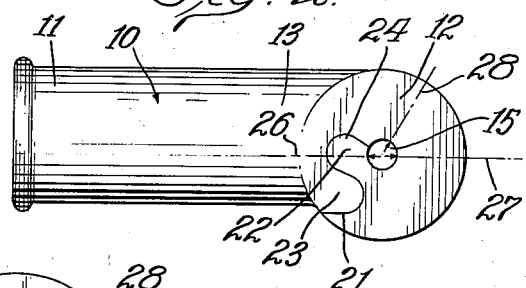
Fig. 2 is a side view of the rubber coupler in normal or closed position.

In Figure 2 may be seen arrows 26, 27 and 28. The arrow 26 indicates the direction of distortion of the journal 15 and also the point on the journal 15 at which the force from the handle acts on the push stroke of the mop; and between arrows 27 and 28 on the surface of the journal 15 is the point where the force acts on the journal during the pull stroke of the handle—the point varying in accordance with the tilt of the handle in the operator's hand. On the push stroke, the pressure is through the S and hence the slit is held tight. On the pull stroke, the force is outward between the arrows 27 and 28 and the tensile strength of the rubber is sufficiently great to hold the S-slit fairly tight. On neither stroke is the frame bearing 16 pushed directly into the S-slit 21.

The positioning of the S-slit is critical only to this extent: in general, the forces acting between the bearing 16 and the journal 15 are at the tip of the arrow 26 or at some point between the arrows 27 and 28 and it is therefore undesirable to have the entering edge of the S-slit into the journal 15 at any one of these points. But the entering edge of the S-slit may be at any other point of the journal 15. The principal value of the S configuration lies in the interlocking tongues which generally assist in holding the S-slit in normal or closed position when a distorting force is directed toward the S side of the journal.

The slit may have many configurations. A straight slit will work. A variety of more complicated slits may be conceived. But all depend upon this principle: the use of a continuous slit in an elastic wall into a journal.

Figure 3:
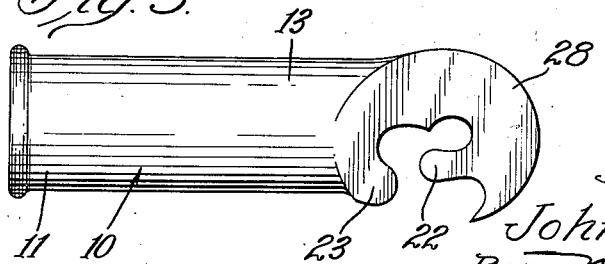
Fig. 3 is a side view of the rubber coupler in open position.

The procedure for mounting the mop head in the coupler is obvious. The coupler is opened as shown in Fig. 3, the journal of the frame inserted, and the coupler released to normal position shown in Figs. 1 and 2.

Attention is called to the fact that pivotal action between the mop head and the coupler is not necessary. The hole 15 may have any cross section to receive some corresponding element of the mop head.

I claim:

1. A mop comprising, in combination, a handle, a mop frame and a flexible rubber coupler having a handle socket, a seat in the rubber coupler which normally completely encircles a member for holding the mop frame, and a slit through the flexible rubber wall into the seat whereby the rubber coupler may be spread on both sides of the slit to remove the holding member.

2. A mop comprising, in combination, a handle, a mop frame and a flexible rubber coupler having a handle socket, a seat in the rubber coupler which normally completely encircles a member for holding the mop frame, and a slit through the flexible rubber wall into the seat at a point in the seat where under normal usage, the holding member of the frame does not press against the seat whereby the rubber coupler may be spread on both sides of the slit to remove the holding member.

3. A mop comprising, in combination, a handle, a mop frame and a flexible rubber coupler having a handle holding means, a journal in the rubber coupler which normally completely encircles a bearing on the mop frame and an S-slit between the outer edge of the flexible rubber wall and the journal whereby the rubber coupler may be spread on both sides of the slit to remove the holding member.

4. A mop comprising, in combination, a handle, a mop frame and a flexible rubber coupler having a handle socket, a journal in the rubber coupler which normally completely encircles a bearing on the mop frame, and a continuous S-slit connecting the journal to the outer edge of the coupler and lying between the journal and the handle socket whereby the rubber coupler may be spread on both sides of the slit to remove the holding member.

5. A mop comprising, in combination, a handle, a mop frame and a flexible rubber coupler having a handle holding means, a seat to receive a member for holding the mop frame, and a continuous slit connecting the seat to the outer edge of the coupler and entering the journal at a point above the axis of the handle holding means.

JOHN P. CLOSSON.